Dec. 14, 1937.   W. R. TALIAFERRO ET AL   2,102,294
CONTROL SYSTEM
Filed Oct. 15, 1935   2 Sheets-Sheet 1
Fig. 1.
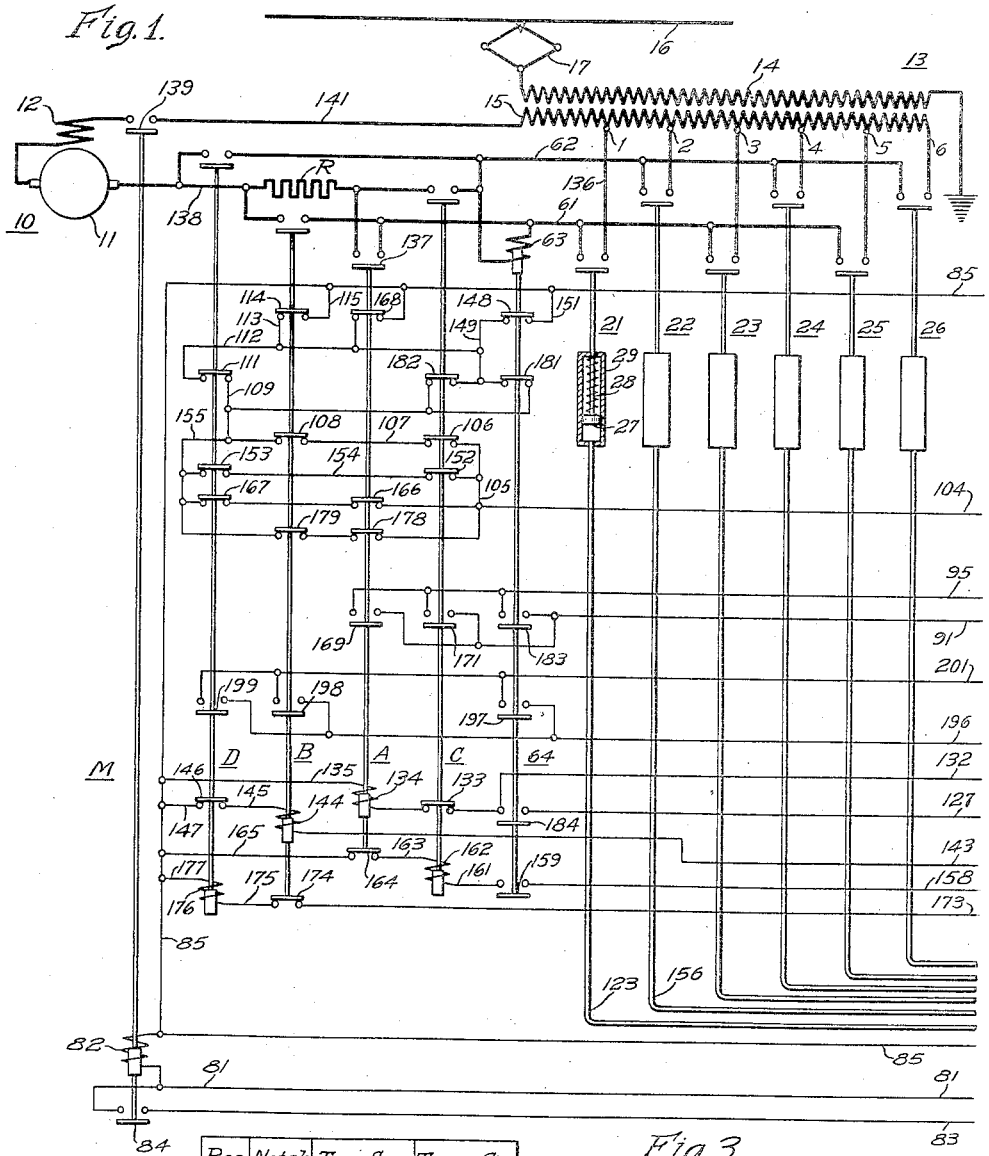
Fig. 3.
Fig. 4.
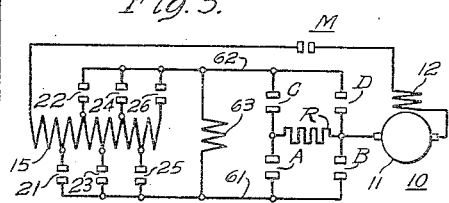
| Pos. | Notch | Tap Sw. | | Tran. Sw. | |
|---|---|---|---|---|---|
| a | 1 | 21 | | A | |
|   | 2 | 21 | | A | B |
| b | 3 | 21 | 22 | B | C |
|   | 4 | 22 | | C | D |
| c | 5 | 22 | 23 | A | D |
|   | 6 | 23 | | A | B |
| d | 7 | 23 | 24 | B | C |
|   | 8 | 24 | | C | D |
| e | 9 | 24 | 25 | A | D |
|   | 10 | 25 | | A | B |
| f | 11 | 25 | 26 | B | C |
|   | 12 | 26 | | C | D |
WITNESSES:
C. J. Weller.
INVENTORS
William R. Taliaferro,
Charles C. Whittaker and
Lynn G. Riley.
BY
J. M. Crawford
ATTORNEY

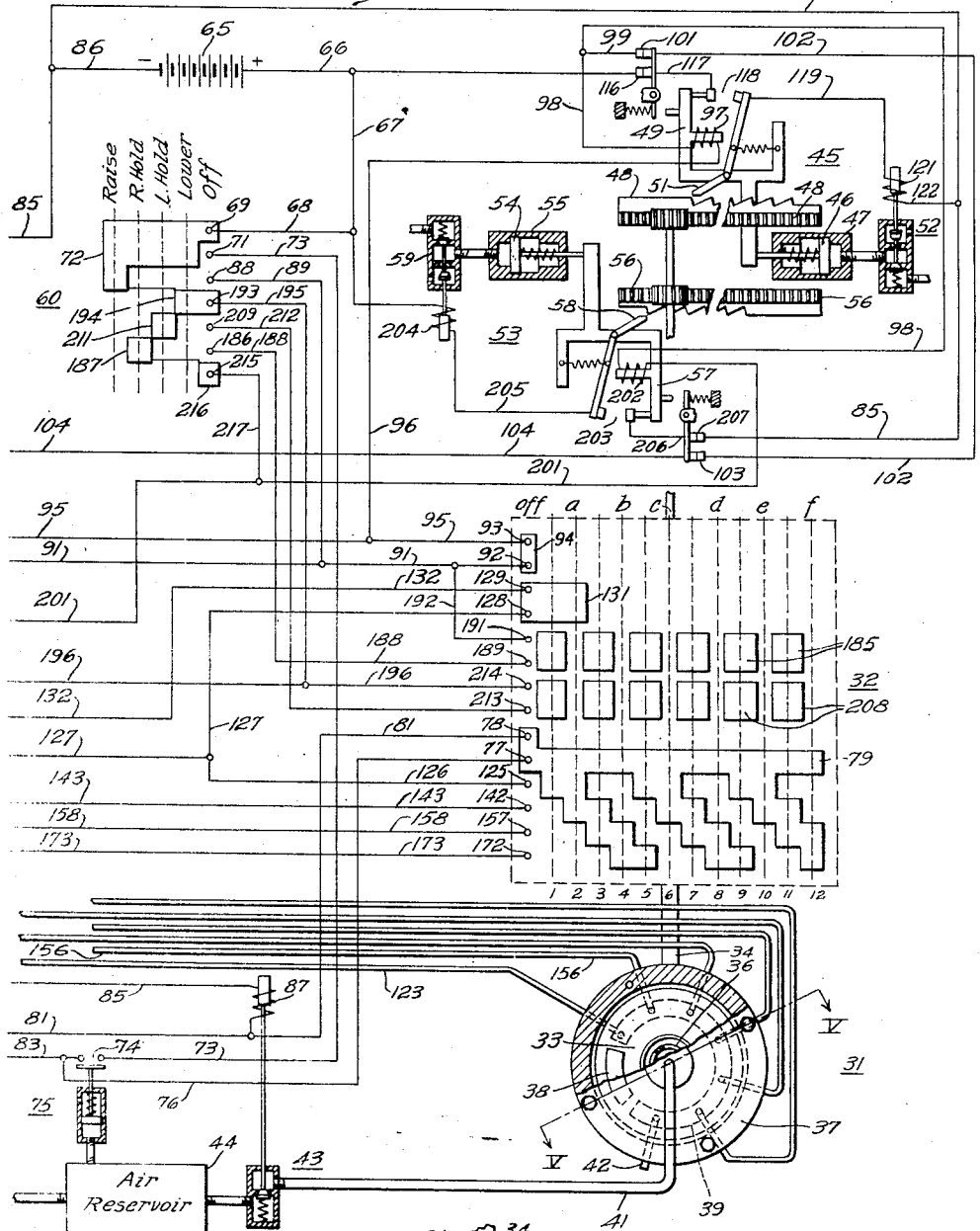

Patented Dec. 14, 1937

2,102,294

UNITED STATES PATENT OFFICE 2,102,294

CONTROL SYSTEM

William R. Taliaferro, Charles C. Whittaker, and Lynn G. Riley, Pittsburgh, Pa., assignors to Westinghouse Electric & Manufacturing Company, East Pittsburgh, Pa., a corporation of Pennsylvania Application October 15, 1935, Serial No. 45,048

7 Claims. (Cl. 171—119)

Our invention relates, generally, to control systems and more particularly to systems for controlling the operation of electric locomotives and other electrically-propelled vehicles.

At the present time the usual practice is to change the taps on a locomotive transformer or on the starting resistor, in the case of a direct current locomotive, by means of unit switches which must be capable of interrupting the power circuit. Consequently, each switch is large in size and expensive to design and manufacture. In most of the control systems utilized at present on alternating current locomotives, the switching operations are accompanied by severe current and voltage surges which further increase the cost and size of the apparatus in order to withstand these surges.

An object of the present invention, generally stated, is to provide a control system for electric vehicles which shall be simple and efficient in operation and which may be economically manufactured and installed.

A more specific object of the invention is to provide a tap-changing system in which the power circuit is not interrupted by the tap-changing switches.

Another object of the invention is to prevent surges during the switching operations of a tap-changing system.

A further object of the invention is to provide for mutually interlocking the switches of a tap-changing system.

Other objects of the invention will be explained fully hereinafter or will be apparent to those skilled in the art.

According to one embodiment of the invention, small, light and inexpensive air-operated switches are utilized for tap-changing instead of the heavy and large circuit-breaking switches previously used. The tap-changing switches are so connected in the system that they never interrupt the power circuit. The circuit breaking duty is performed by four transition switches, and a transition resistor is so connected between these four switches that surges during the switching operations are greatly reduced. The operation of the tap changing switches is controlled by a rotary air valve driven by the same shaft as the sequence drum which controls the operation of the transition switches. Protective interlocking is provided to prevent any part of the equipment from performing an operation which would be destructive to itself or associated equipment.

For a fuller understanding of the nature and objects of the invention, reference may be had to the following detailed description, taken in conjunction with the accompanying drawings, in which:

Figures 1 and 2 may be combined to make a diagrammatic view of a control system embodying the invention;

Fig. 3 is a diagrammatic view showing the main power circuit;

Fig. 4 is a chart showing the sequence of operation of a portion of the apparatus in the control system, and Fig. 5 is a view, in section, taken along the line V—V through the rotary air valve shown in Fig. 2.

Referring to the drawings, the system shown comprises a motor 10 having an armature 11 and a series field winding 12, and a transformer 13 having a primary winding 14 and a secondary winding 15. The transformer 13 is energized from a trolley conductor 16 through a pantograph 17. The conductor 16 may be connected to any suitable source of power (not shown).

A plurality of tap-changing switches 21 to 26, inclusive, are provided for increasing the voltage applied to the motor 10 in a step-by-step manner well known in the art. Transition switches A, B, C, D and a transition resistor R cooperate with the tap-changing switches in a manner to be more fully described hereinafter. The transition resistor R permits the switches A and D or B and C to be closed at the same time for a short while during transition from one tap to another. A motor cut-out switch M is provided for disconnecting the motor 10 from the transformer 13.

In order to decrease the size and cost of the tap-changing switches 21 to 26, inclusive, they are operated by air, or other fluid pressure, and the control system is so designed that the tap changing switches do not interrupt the power circuit through the motor 10, the transition switches A, B, C and D being utilized for that purpose. As shown, the moving contact member of the tap-changing switch 21 is actuated by a piston 27 which opposes a spring 28, both of which are disposed in a cylinder 29. The other tap-changing switches are constructed in the same manner as the switch 21.

The operation of the tap-changing switches 21 to 26, inclusive, is controlled by a rotary air valve 31, driven by the shaft of a sequence drum 32 which controls the operation of the transition switches A, B, C and D. In this manner the operation of the tap-changing switches and the transition switches is so controlled that the tap-changing switches can only close or open when the power circuits to which the respective tap-changing switches are connected are either open or carrying no current. As explained hereinbefore, the power circuits are interrupted by the transition switches A, B, C and D during the tap-changing operations, the transition switches being constructed for circuit breaking duty.

The rotary air valve 31 is similar in construction to a brake valve for an air-brake system except that it has a larger number of ports. The valve shown comprises a rotary disc 33 driven by a shaft 34 of the sequence drum 32. The disc 33 is compressed against a valve seat 35 by a spring 36 disposed inside of a cover 37. An inlet cavity 38 and an exhaust cavity 39 are provided in the rotary disc 33 to control the flow of the pressure fluid through the ports to which the pipes leading to the tap-changing switches are connected. The pressure fluid is admitted to the valve through a pipe 41 and exhausted through a pipe 42. As the disc 33 rotates, the inlet cavity alternately covers one and then two ports while the exhaust cavity covers the remaining ports, thereby operating the tap-changing switches 21 to 26 in a definite sequence. An electrically-operated fluid valve 43 controls the flow of air from an air reservoir 44 to the rotary valve 31.

The sequence drum 32 and the rotary valve 31 are rotated in one direction by a notching device 45 which may be of the type fully described in Patent No. 1,987,709, issued January 15, 1935, to L. G. Riley. Briefly, the notching device 45 comprises a piston 46 disposed in a cylinder 47, a rack 48, an electromagnet 49, a pawl or trigger 51 actuated by the magnet 49, and an electrically-operated fluid valve 52 for controlling the admission of a pressure fluid to the cylinder 47. The electromagnet 49 and the trigger 51 are carried by the piston 46 and the trigger engages the rack 48 to advance it one notch for each stroke of the piston 46.

A similar notching device 53 is provided for rotating the drum 32 and the valve 31 in the opposite direction. The notching device 53 comprises a piston 54 disposed in a cylinder 55, a rack 56, an electromagnet 57, a trigger 58 and a fluid valve 59.

The operation of the notching devices 45 and 53 may be manually controlled by a master controller 60 of the drum type. The controller shown has five positions, an "off", "lower", "lower hold", "raise hold", and "raise" position. In the "raise" position of the controller 60, the voltage on the traction motor is increased one step at a time until the maximum is reached. If the controller handle is placed in either one of the "hold" positions, the notching device stops. Further advance is obtained by placing the handle again in the "raise" position or the voltage can be lowered by placing the handle in the "lower" position. When the controller handle is in the "off" position all power is removed from the motor 10, and the sequence drum must be returned to the full "off" position by the notching device 53 before power can be reapplied.

It will be noted that the tap-changing switches 21, 23 and 25 are connected to a bus 61 and the tap-changing switches 22, 24 and 26 are connected to another bus 62. The buses 61 and 62 are connected to the motor 10 by the transition switches A, B, C and D, one end of the transition resistor R being connected between the switches A and C and the other end between the switches B and D, as shown more clearly in Fig. 3.

The actuating coil 63 of a protective relay 64 is connected across the buses 61 and 62. The function of the relay 64 is to stop the advancement or retraction of the sequence drum 32 in case both buses 61 and 62 are energized when only one bus should be energized and to stop the sequence drum in case only one bus is energized when both should be energized, also to stop the drum in the event that line power fails.

A battery 65, or other reliable source of power, is utilized to provide energy for operating the control apparatus in the system.

The sequence of operation of the tap-changing switches and the transition switches may be understood by referring to the schematic diagram shown in Fig. 3. Assuming the first notch is to be taken, tap-changing switch 21 closes and is followed by switch A. Current now flows from bus 61 through switch A, the transition resistor R and the motor 10. Switch B then closes and A opens, thus cutting resistor R out of the circuit. By the time switch A opens the tap-changing switch 22 has been closed. Switch C closes next and a circulating current flows from tap-changing switch 22 through resistor R to tap-changing switch 21, but is limited to such a value by resistor R that when switch B opens the voltage at the motor does not change, thereby preventing surges during the switching operations. After switch B opens, tap-changing switch 21 opens, D then closes and C opens, thereby completing two notches or taps on the transformer 13. The tap-changing switch 23 then closes and is followed by A. The transition resistor R again functions to prevent a surge when the switch D is opened and the foregoing sequence is repeated throughout the notching operation.

The transition switches A, B, C and D are provided with protective interlocks which cooperate with the relay 64 to insure the proper operation of the various switches. These interlocks are connected to prevent the advancement of the notching engine 45 if the switches do not follow the normal sequence or delay the advance if the switches are sluggish, to mutually interlock the switches A and C, also B and D, to permit the sequence of operation to start and to by-pass the relay 64 when it has accomplished its function. If desired, the tap-changing switches which are connected to a common bus may be mechanically interlocked with each other as an additional safeguard against improper operation of the switches.

In order that the functioning of the foregoing apparatus may be more clearly understood, the operation of the system will now be described in detail. Assuming that it is desired to connect the motor 10 to the power source and to gradually increase the voltage applied to the motor to accelerate the vehicle, the master controller 60 is actuated to the "raise" position, thereby energizing the actuating coils of the switch M and the electrically-operated air valve 43. The energizing circuit for the actuating coil of the switch M may be traced from the positive terminal of the battery 65 through conductors 66, 67 and 68, contact fingers 69 and 71—bridged by contact segment 72 of the master controller 60—conductor 73, contact members 74 of an air pressure relay 75, conductor 76, contact fingers 77 and 78— bridged by a contact segment 79 of the sequence drum 32—conductor 81, the actuating coil 82 of the switch M and conductors 85 and 86 to the negative terminal of the battery 65. The circuit through the actuating coil of the air valve 43 extends from the previously energized conductor 81 through the coil 87 of the air valve 43 and conductors 85 and 86 to the battery 65.

A holding circuit for the actuating coils 82 and 87 of the switch M and the air valve 43, respectively, is established upon the closing of the switch M. This circuit may be traced from the previously energized conductor 76 through conductor 83, an interlock 84 on the switch M to the conductor 81 and thence through the actuating coils 82 and 87 as previously traced.

Since the sequence drum 32 is in the "off" position, the trigger magnet 49 of the raise notching device 45 is energized through a circuit which may be traced from a contact finger 88, which engages the segment 72 of the master controller 60, conductors 89 and 91, contact fingers 92 and 93—bridged by a segment 94 on the sequence drum 32—conductors 95 and 96, the coil 97 of the electromagnet 49, conductors 98 and 99, contact members 101 on the notching device 45, conductor 102, contact members 103 on the notching device 53, conductors 104 and 105, an interlock 106 on the transition switch C, conductor 107, an interlock 108 on the switch B, conductor 109, an interlock 111 on the switch D, conductors 112 and 113, an interlock 114 on the switch E, and conductors 115, 85 and 86 to the negative terminal of the battery 65.

The energization of the electromagnet 49 causes the trigger 51 to engage the rack 48 and also establishes an energizing circuit for the actuating coil of the magnet valve 52. This circuit may be traced from the positive terminal of the battery 65 through conductor 66, contact members 116, conductor 117, contact members 118 on the electromagnet 49, conductor 119, the actuating coil 121 of the magnet valve 52 and conductors 122, 85 and 86 to the negative terminal of the battery 65.

The energization of the actuating coil of the magnet valve 52 admits air to the cylinder 47, thereby actuating the piston 46 to advance the sequence drum 32 one notch and also rotate the rotary valve 31, which is driven by the shaft 34 of the sequence drum, as explained hereinbefore. The rotation of the valve 31 admits air to a pipe 123 which is connected to the cylinder 29 of the tap-changing switch 21, thereby actuating the piston 27 to close the contact members of the switch 21.

Following the closing of the switch 21, the transition switch A is closed, thereby connecting the motor 10 to the secondary winding 15 of the transformer 13. The energizing circuit for the actuating coil of the switch A may be traced from a contact finger 125, which engages the segment 79 of the sequence drum 32, conductors 126 and 127, contact fingers 128 and 129—bridged by a segment 131—conductor 132, an interlock 133 on the switch C, the actuating coil 134 of the switch A, and conductors 135, 85 and 86 to the battery 65. The circuit through the motor 10 may be traced from a tap 1 of the transformer 13 through conductor 136, the contact members of the switch 21, conductor 61, contact members 137 on the switch A, the resistor R, conductor 138, the armature winding 11 and field winding 12 of the motor 10, contact members 139 of the switch M, and conductor 141 to the secondary winding 15 of the transformer 13.

When the piston 46 of the notching device 45 reaches the end of its stroke, the contact members 101 and 116 are opened, thereby deenergizing the trigger magnet 49 and the magnet valve 52, and the piston 46 is retrieved by spring action. The retrieving of the piston 46 permits the contact members 101 and 116 to reclose and the notching device repeats another stroke which actuates the sequence drum to position "a".

The actuation of the sequence drum 32 to position "a" energizes the actuating coil of the transition switch B through a circuit which extends from a contact finger 142, which engages the segment 79 of the sequence drum 32, through conductor 143, the actuating coil 144 of the switch B, conductor 145, an interlock 146 of the switch D and conductors 147, 85 and 86 to the battery 65.

The notching device 45 repeats another stroke since the circuit through the energizing coil 97 of the trigger magnet 49, which was interrupted by the closing of the switches A and B, thereby opening the interlocks on these switches, is maintained through the contact members 148 on the relay 64 which is still in its lower-most position. The energizing circuit for the magnet coil 97 is maintained from conductor 112 through conductor 149, the contact members 148 and conductors 151, 85 and 86 to the battery 65. Since the switches C and D are both still open, the energizing circuit for the coil 97 of the trigger magnet 49 is also maintained through interlocks 152 and 153 on the switches C and D, respectively, which are connected in parallel with the interlocks 106 and 108 on the switches C and B, respectively, the circuit now extending from conductor 105 through interlock 152, conductor 154, the interlock 153 and conductor 155 to the conductor 109.

The advancement of the sequence drum and the rotary air valve another notch permits air to be admitted to the pipe 156 to close the tap-changing switch 22 and also causes the switch A to be opened by deenergizing the circuit through its actuating coil. Following the opening of the switch A the switch C is closed. The energizing circuit for the actuating coil of the switch C may be traced from a contact finger 157, which engages the segment 79 of the sequence drum 32, through conductor 158, an interlock 159 on the relay 64, which is now closed since the tap-changing switches 21 and 22 are both closed, conductor 161, the actuating coil 162 of the switch C, conductor 163, an interlock 164 on the switch A, and conductors 165, 85 and 86 to the battery 65.

At this time the transition switches B and C are closed and A and D are open, the tap-changing switches 21 and 22 are also closed. The circuit for the energizing coil 97 of the trigger magnet 49 is transferred from the interlocks 152 and 153 on the switches C and D, respectively, to the interlocks 166 and 167 on the switches A and D, respectively. Since the tap-changing switches 21 and 22 are both closed, the relay 64 is actuated to its uppermost position and the circuit through its contact members 148 is interrupted. This circuit is, therefore, transferred to the interlock 168 on the switch A. Also the circuit through an interlock 169 on the switch A, which parallels the contact fingers 92 and 93 on the sequence drum, is transferred to an interlock 171 on the switch C which is closed at this time, thereby connecting the conductors 91 and 95 together.

Therefore, the notching device 45 advances the sequence drum another step to position "b" to open switch B and close switch D, the tap-changing switch 21 being opened after the opening of switch B, since the air is permitted to exhaust from a pipe 123 through the exhaust cavity 39 of the rotary valve 31. The energizing circuit for the actuating coil for the switch D may be traced from a contact finger 172, which engages the segment 79 of the sequence drum 32, through conductor 173, interlock 174 on the switch B, conductor 175, actuating coil 176 of the switch D and conductors 177, 85 and 86 to the battery 65. At this time the transition switches C and D are closed, the tap-changing switch 22 is closed and the relay 64 is in its lower-most position.

Since the switch D is closed the circuit through the interlocks 166 and 167 on the switches A and D, respectively, is transferred to the interlocks 178 and 179 on the switches A and B, respectively, thereby maintaining the energizing circuit for the trigger magnet coil 97. Therefore, the notching device 45 advances the rotary valve 31 and the sequence drum 32 another step to close the tap-changing switch 23 and open the transition switch C. Following the opening of the switch C the transition switch A is closed. A contact member 184 on the relay 64 is connected in parallel with the contact members 128 and 129 on the sequence drum 32 to permit the switch A to be closed the second time, the segment 131 being provided on the sequence drum only to permit the sequence of operation to start when the sequence drum 32 is in the "off" position.

Since the relay 64 is now in its uppermost position, the tap-changing switches 22 and 23 both being closed, the circuit which was transferred from the interlock 111 on the switch D to a contact member 181 on the relay 64 when the switch D was closed is now transferred to an interlock 182 on the switch C. Also the circuit through the interlock 171 on the switch C is transferred to a contact member 183 on the relay 64. Therefore the sequence drum is advanced another step to position "c" to open the switch D and close the switch B. Following the opening of the switch D the rotary valve 31 permits the tap switch 22 to be opened.

The foregoing sequence of operation of the tap-changing switches and the transition switches under the control of the rotary air valve 31 and the sequence drum 32 is followed so long as the master controller 60 is held in the "raise" position. In this manner the voltage applied to the motor 10 is increased by closing the tap-changing switches 21 to 26 consecutively to connect the motor 10 to taps 1 to 6, inclusive, of the transformer 13.

If it is desired to stop the advancement of the sequence drum 32, the master controller 60 is actuated to the "raise hold" position, thereby deenergizing the trigger magnet 49. However, the sequence drum will advance to the next full notch or position, in the event the change is made between positions, as a result of the action of the carry-over contact segments 185 on the sequence drum which maintain the energizing circuit for the trigger magnet 49 between positions of the sequence drum. This circuit may be traced from a contact finger 186, which engages a segment 187 on the master controller 60, through conductor 188, contact fingers 189 and 191—bridged by one of the contact segments 185—and conductor 192 to conductor 91 and thence through the circuit previously traced.

In case it is desired to lower the voltage applied to the motor 10, the master controller 60 is actuated to the "lower" position, thereby energizing the trigger magnet 57 on the notching device 53 which returns the sequence drum 32 towards the "off" position step-by-step in the same manner as the notching device 45 advances the drum. The energizing circuit for the trigger magnet 57 may be traced from a contact finger 193, which engages the segment 194 of the controller 60, through conductors 195 and 196, one of the parallel contact members 197, 198 or 199 on the relay 64 and the switches B and D, respectively, conductor 201, the energizing coil 202 on the magnet 57, conductor 98 to the conductor 99 and thence through one of the circuits previously traced for the energizing coil 97 of the trigger magnet 49.

The closing of the contact members 203 on the trigger magnet 57 establishes a circuit for the actuating coil of the magnet valve 59, thereby admitting air to the cylinder 55 to operate the piston 54 in the manner previously described. The energizing circuit for the actuating coil of the magnet valve 59 may be traced from the battery 65 through conductors 66 and 67, the actuating coil 204, conductor 205, contact members 203, conductor 206, contact members 207 on the notching device 53 and conductors 85 and 86 to the negative terminal of the battery 65.

The sequence drum 32 may be retained on any position during the lowering operation by actuating the master controller 60 to the "lower hold" position. The carry-over segments 208 function to maintain the energizing circuit for the coil 202 on the trigger magnet 57 to retract the drum 32 to the next position in a manner similar to the segments 185 during the raising operation. This circuit may be traced from the contact finger 209, which engages the segment 211 on the master controller 60, through conductor 212, contact fingers 213 and 214—bridged by one of the contact segments 208—to conductor 196 and thence through the circuit previously traced.

If the master controller 60 is actuated to the "off" position at any time during the operation of the system, the switches A, B, C, D and M are opened and the air valve 43 is closed at once, thereby removing all power from the traction motor 10, and the sequence drum 32 must be returned to the "off" position before power can be reapplied to the motor. The contact finger 215 and segment 216 on the controller 60 function to energize the lowering notching device 53 to return the sequence drum 32 to the "off" position, the contact finger 215 being connected to the conductor 201 by the conductor 217.

In order to simplify the drawings and description, only six taps on the transformer 13 and six tap-changing switches have been illustrated. However, it will be understood that as many taps as desired may be utilized, one of the advantages of the present system being that the tap-changing switches are small and of low cost. Therefore, a larger number may be provided in the space available in the locomotive or other vehicle. In this manner the operation of the vehicle may be considerably improved by increasing the number of taps on the power transformer.

From the foregoing description, it is apparent that we have provided a control system suitable for controlling the operation of electrically propelled vehicles which will be lower in cost and more satisfactory in operation than systems of the present type in which it is necessary for each one of the tap-changing switches to be able to withstand a circuit breaking duty. It is also evident that we have provided a system in which surges are prevented from occurring during the tap-changing operations.

Since many modifications may be made in the apparatus and arrangement of parts without departing from the spirit of the invention, we do not desire to be limited other than by the scope of the appended claims.

We claim as our invention:

1. In a tap-changing system, in combination, electrical conversion apparatus, a plurality of switches for changing taps on said apparatus, fluid-pressure means for operating said tap-changing switches, circuit-breaking switches for connecting the tap-changing switches to a power circuit, means for controlling the operation of said circuit-breaking switches, and fluid-controlling means actuated by the circuit-breaking switch controlling means for controlling the operation of the tap-changing switches.

2. In a tap-changing system, in combination, electrical conversion apparatus, a plurality of switches for changing taps on said apparatus, fluid-pressure means for operating said tap-changing switches, circuit-breaking switches for connecting the tap-changing switches to a power circuit, means for controlling the operation of said circuit-breaking switches, and fluid-controlling means actuated by the circuit-breaking switch controlling means for controlling the operation of the tap-changing switches, said switch controlling means and fluid-controlling means cooperating to prevent the tap-changing switches from interrupting the power circuit.

3. In a tap-changing system, in combination, electrical conversion apparatus, a plurality of switches for changing taps on said apparatus, fluid-pressure means for operating said tap-changing switches, circuit-breaking switches for connecting the tap-changing switches to a power circuit, means for controlling the operation of said circuit-breaking switches, fluid-controlling means actuated by the circuit-breaking switch controlling means for controlling the operation of the tap-changing switches, said switch controlling means and fluid-controlling means cooperating to prevent the tap-changing switches from interrupting the power circuit, and means associated with the circuit-breaking switches to prevent surges during the switching operations.

4. In a tap-changing system, in combination, electrical conversion apparatus, a plurality of switches for changing taps on said apparatus, fluid-pressure means for operating said tap-changing switches, circuit-breaking switches for connecting the tap-changing switches to a power circuit, a sequence drum for controlling the operation of said circuit-breaking switches, a fluid valve for controlling the operation of the fluid-pressure operated tap switches, and a common means for operating said sequence drum and said fluid valve.

5. In a tap-changing system, in combination, electrical conversion apparatus, a plurality of switches for changing taps on said apparatus, fluid-pressure means for operating said tap-changing switches, circuit-breaking switches for connecting the tap-changing switches to a power circuit, a sequence drum for controlling the operation of said circuit-breaking switches a fluid valve for controlling the operation of the fluid-pressure operated tap switches, a common means for operating said sequence drum and said fluid valve, and interlocking means associated with said switches for controlling the operation of said common operating means.

6. In a tap-changing system, in combination, electrical conversion apparatus, a plurality of switches for changing taps on said apparatus, fluid-pressure means for operating said tap-changing switches, circuit-breaking switches for connecting the tap-changing switches to a power circuit, a sequence drum for controlling the operation of said circuit-breaking switches, a fluid valve for controlling the operation of the fluid-pressure operated tap switches, a common means for operating said sequence drum and said fluid valve, interlocking means associated with said switches, and relay means cooperating with said interlocking means to control the operation of said common operating means.

7. In a tap-changing system, in combination, electrical conversion apparatus, a plurality of switches for changing taps on said apparatus, alternate ones of said tap-changing switches being connected to a common bus, transition switches for connecting said buses to a power circuit, means for operating said switches, current limiting means connected between the transition switches for preventing surges during the switching operations, interlocking means associated with said transition switches, and relay means responsive to the potential between said buses and cooperating with said interlocking means to control the operation of said switch operating means.

WILLIAM R. TALIAFERRO.
CHARLES C. WHITTAKER.
LYNN G. RILEY.